Nov. 12, 1968 D. A. GSTOHL 3,410,700

PACKAGE FOR FROZEN PIZZA AND THE LIKE

Filed Oct. 25, 1965

INVENTOR
Donavon A. Gstohl
BY Merchant, Merchant & Gould
ATTORNEY

United States Patent Office 3,410,700
Patented Nov. 12, 1968

3,410,700
PACKAGE FOR FROZEN PIZZA AND THE LIKE
Donavon A. Gstohl, Sioux Falls, S. Dak., assignor, by mesne assignments, to Marigold Foods, Inc., Minneapolis, Minn., a corporation of Minnesota
Continuation-in-part of application Ser. No. 363,667, Apr. 22, 1964, which is a continuation of abandoned application Ser. No. 159,069, Dec. 13, 1961. This application Oct. 25, 1965, Ser. No. 505,162
7 Claims. (Cl. 99—192)

This appplication is a continuation-in-part of my application entitled "Package for Frozen Pizza and the Like," filed Apr. 22, 1964, under Ser. No. 363,667, now abandoned, which was a continuation of Ser. No. 159,069, filed Dec. 13, 1961, now abandoned.

My invention relates generally to packaging and more specifically to the packaging of food items.

Still more specifically my invention relates to the packaging of precooked frozen food products such as pizza, French toast, pancakes and the like. Such food products are generally flat and of a size and shape to be reheated in a conventional electrical toaster wherein they are disposed in a vertical position. However, such products as pizza which are coated on one side with cheese, pepperoni, ground meat, tomato paste and the like, can obviously not be heated in a toaster when removed from the packages in which they are shipped and stored because such ingredients when reheated would become dislodged and fall into the bottom of the toaster.

A primary object of my invention is the provision of a combination merchandising and reheating envelope-like package for generally flat frozen food products such as pizza, which will permit rapid reheating of said product in a vertical position in a conventional toaster and which will hold the ingredients in place during such reheating and during removal thereof from the toaster.

A further object of my invention is the provision of a package of the type immediately above described which comprises laterally spaced side wall elements formed from a flexible sheet of a type which will resist the heat of rapid reheating and which will resist deterioration by the food product contained therein during storage, shipment and reheating.

A still further object of my invention is the provision of a package of the type above described, the side walls of which are provided with highly perforated screen-like areas conforming generally to the area defined by the enclosed product, whereby to permit ingress of heat and egress of steam vapors or the like during the reheating process.

A further object of my invention is the provision of a package of the class above described wherein said perforate areas are spaced from the joined lower edges of the side walls 2 of the package whereby to provide an imperforate trough 3a for collection of juices or crumbs freed from the product during shipment or reheating.

A still further object of my invention is the provision of a package of the type above described wherein said perforate areas are provided with readily removable sheet-like cover elements, the marginal edges of which are adhesively secured to the adjacent side walls intermediate said perforate areas and the marginal edges of said side walls whereby the enclosed product may be sanitarily sealed during shipment and storage but may be readily exposed for reheating in a minimum of time and within a minimum of effort.

A still further ebjoce of my invention is the provision of a package of the type above described which is extremely inexpensive to produce and which is extremely easy to place about and remove from a frozen food product.

The above and still further objects of my invention will become apparent from the following detailed specification, appended claims and attached drawings.

Referring to the drawings wherein like characters indicate like parts through the several views.

Figure 1:
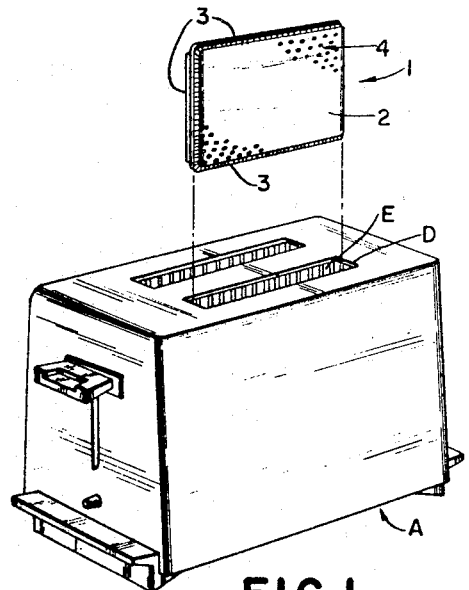
FIG. 1 is a perspective view of a conventional toaster illustrating insertion of my novel package therein.

Referring with greater particularity to the drawings, the number 1 indicates in its entirety my novel package, the opposite side walls thereof being identified by 2. The walls 2 are formed of thin flexible sheet material, such as aluminum foil, capable of withstanding the rapid heat of reheating in a conventional electric toaster, identified by the letter A. It is likewise important that the sheet material be of the type which is inert to the product B, such as pizza enclosed therein not only during storage and shipment but also during the reheating operation. Aluminum foil also satisfies this requirement.

As shown, the side walls 2 engage opposite sides $c$ of the product B, the marginal edges thereof being connected by a continuous joint 3 conforming generally to the contour of the product B and being closely adjacent the marginal edge of said product B. This arrangement assures that the side walls 2 firmly engage the opposite sides $c$ of the product B during the reheating operation in the electric toaster A.

Each of the side walls 2 is provided with a highly perforate screen-like area 4 which areas conform generally to the adjacent area of product B. This arrangement permits a maximum exposure of the opposite sides $c$ of the product B to radiant and other heat generated within the toaster A during the reheating operation, while at the same time permitting the escape of any steam or vapor which may be generated during this operation. Preferably, and as shown, the perforate areas 4 are laterally inwardly spaced from a least the lower peripheral edge of the product B and of the joint or seal 3, whereby to define an imperforate marginal trough 5 for the collection of juices, moisture, crumbs or the like which either may be created during shipment and storage or during the heating operation.

When it is desired to reheat a frozen product B, such as pizza, enclosed within my novel combination merchandising and reheating package 1, the package 1 with the product B therein is placed within the upwardly opening mouth D of the toaster A so that the same comes to rest within the vertically extended heating chamber E. One or more heating cycles may be required to properly heat the product B. However, the product will be heated rapidly due to heat entering the perforated areas 4 and impinging directly upon the opposite sides C of the product B. When the product B is pizza or the like the pressure exerted against the opposite sides $c$ thereof by the side walls 2 of each package 1 maintains the cheese, ground meat, tomato paste and the like in position while any juices which may drop therefrom will be collected within the trough 5.

Figure 4:
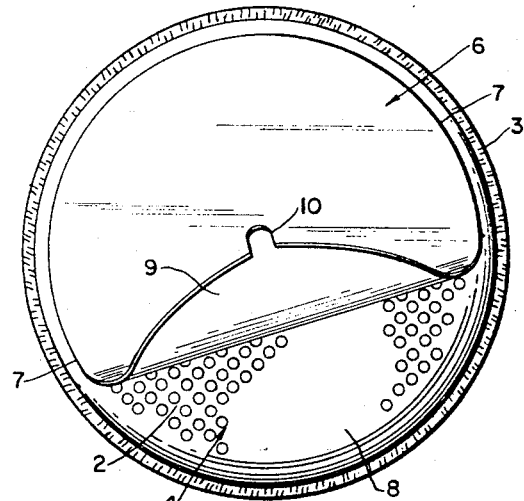
FIG. 4 is a view corresponding to FIG. 2 but showing a modified form of my invention.
Figure 2:
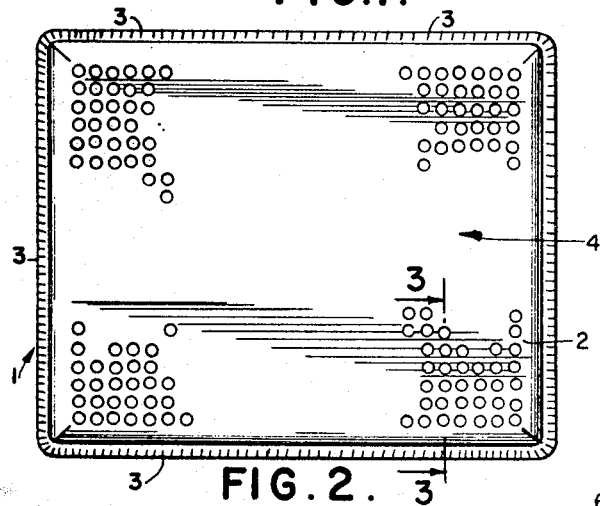
FIG. 2 is a view in top plan of the package shown in FIG. 1 on a greatly enlarged scale.
Figure 3:
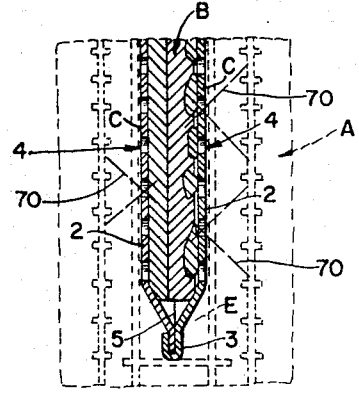
FIG. 3 is a sectional view taken on the line 3—3 of FIG. 2, some parts being broken away, illustrating the position of the package in a toaster, said toaster being shown in dotted lines.

The structure of FIG. 4, while showing a package of different shape than that shown in FIGS. 1 to 3, inclusive, is identical in construction with the sole exception that the same includes readily removable flexible sheet-like cover elements 6. These cover elements are, of course, imperforate and may also be formed from sheet aluminum foil or the like. It will be noted that the cover elements 6 completely overlie the perforate areas 4 and have their marginal edges 7 secured adjacent the side wall in the imperforate areas 8 intermediate the perforated areas 4 and the joint 3. Preferably pressure-sensitive adhesive 9 is utilized for this purpose. Also preferably, and as shown, each of the cover elements 6 is provided with a radially outwardly projecting integrally formed tab 10 which loosely overlies the adjacent annular imperforate areas 8. When it is found desirable or necessary to utilize the cover elements 6, they may be quickly removed immediately prior to placing the package 1 with the product B therein, within the chamber E of the toaster A. However, this arrangement permits the packages 1 to be stored and shipped individually while maintaining the product free from impurities.

Figure 6:
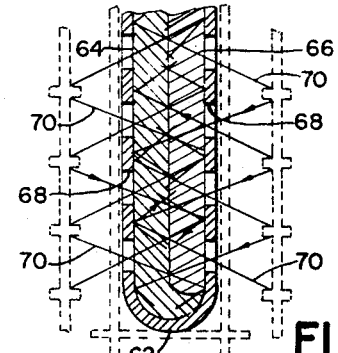
FIG. 6 is a view along the line 6—6 of FIG. 5.
Figure 5:
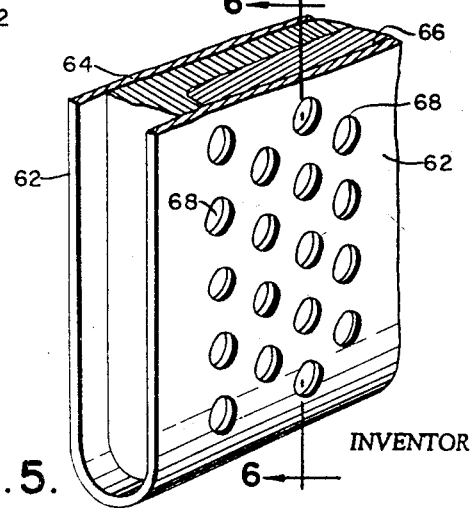
FIG. 5 is a view showing another modification of the invention.

FIGS. 5 and 6 illustrate another modification of the invention in which a single sheet of aluminum foil 62 is folded about the product in supporting contact with the opposite faces 64, 66. The sheet is perforated as at 68 as above described to provide a screen-like structure at least in the areas which overlay the food. In this form of the invention the food product is not completely enclosed but is open on three sides. If desired the sheet of foil can be perforated throughout or separate sheets of perforated foil can be laid on each of the faces 64, 66. While I have disclosed perforated aluminum foil as the preferred material I contemplate the use of other materials which are not affected by heat or react with the food.

In use the frozen product is put into an electric toaster and heated. The heat shown as infra red rays 70 for purposes of illustration, has direct access to and contact with the food through the perforations to thereby provide for quick heating and toasting.

I claim:
1. A merchandising and heatable, precooked generally flat frozen food product package for use in an electric toaster, said food product being selected from the group consisting of pizza, French toast and pancakes, comprising:
    (a) two sheets of aluminum foil completely enclosing said product,
    (b) said sheets comprising generally parallel laterally spaced side walls in firm engagement with the opposite sides of the product and being connected at their marginal edges by a seal conforming generally to the contour of and being adjacent the marginal edges of said enclosed product,
    (c) one of said sheets having its side wall highly perforated in the central area between the margins thereof and covering substantially the entire area of said product, whereby said product is supported by the spaced walls of the entire package for maximum exposure to radiant heat within a toaster,
    (d) and a removable cover sheet secured over said highly perforated area, whereby said package may be safely handled for storage and shipment of its enclosed product free from impurities.
2. The structure defined in claim 1, in which the side walls of each of the sheets being highly perforated in the areas between the margins thereof.
3. The structure defined in claim 1, wherein said perforated area is spaced from said seal to provide an imperforate marginal moisture collecting trough within said package and a marginal attaching area for said cover sheet on the exterior of said package.
4. The structure defined in claim 1 in which said cover sheet is provided with a lifting tab at the marginal edge thereof.

5. A merchandising and heatable, precooked generally flat frozen food product package for use in an electric toaster, said food product being selected from the group consisting of pizza, French toast and pancakes, comprising:
    (a) two sheets of thin flexible sheet material capable of withstanding the rapid heat of reheating in an electric toaster completely enclosing said product,
    (b) said sheets comprising generally parallel laterally spaced side walls in firm engagement with the opposite sides of the product and being connected along the greater portion of the marginal edges by a seal conforming generally to the contour of and being adjacent the marginal edges of said enclosed product,
    (c) the side walls of each of said sheets being highly perforated in the areas between said marginal edges and covering substantially the entire area of said product, whereby said product is supported by the spaced side walls of the entire package for maximum exposure to radiant heat within a toaster.
6. A merchandising and heatable precooked generally flat frozen food product package for use in an electric toaster, said food product being selected from the group consisting of pizza, French toast and pancakes, comprising:
    (a) two sheets of thin flexible sheet material capable of withstanding the rapid heat of reheating in an electric toaster completely enclosing said product,
    (b) said sheets comprising generally parallel laterally spaced side walls in firm engagement with the opposite sides of the product and being connected along the greater portion of the marginal edges, and
    (c) the side walls of each of said sheets being highly perforated in the areas between said marginal edges and covering substantially the entire area of said product, whereby said product is supported by the spaced side walls of the entire package for maximum exposure to radiant heat within a toaster.
7. A merchandising and heatable precooked generally flat frozen food product package for upright disposition in an electric toaster, said food product being a unitary mass such as pizza having a substantially uniform thickness and flat parallel opposite sides, comprising:
    (a) two generally parallel laterally spaced sheets of thin flexible sheet material capable of withstanding the rapid heat of reheating in an electric toaster, one completely covering one side of the product and its other completely covering the other side of the product,
    (b) said sheets being connected to each other along the greater portion of their bottom and side marginal edges by a joint conforming generally to and located adjacent to the marginal edge of the product to hold said sheets in firm engagement with said opposite sides of the product throughout the entire area of said sides and to support the product in erect position, and
    (c) said sheets being highly perforated in the areas between said marginal edges and covering substantially the entire area of said product for maximum exposure of the product sides to the radiant heat within a toaster.

References Cited

UNITED STATES PATENTS

| | | | |
|---|---|---|---|
| 2,268,673 | 6/1942 | Reynolds. | |
| 2,807,550 | 9/1957 | Zarotschenzeff et al. | 99—174 |
| 2,969,292 | 1/1961 | Heller | 99—171 |
| 3,012,895 | 12/1961 | Steinicki | 99—192 |

RAYMOND N. JONES, *Primary Examiner.*

UNITED STATES PATENT OFFICE
CERTIFICATE OF CORRECTION

Patent No. 3,410,700                                                    November 12, 1968

Donavon A. Gstohl

It is certified that error appears in the above identified patent and that said Letters Patent are hereby corrected as shown below:

In the heading to the printed specification, line 4, "Marigold Foods, Inc.," should read -- Toasta Foods Company, --.

Signed and sealed this 3rd day of March 1970.

(SEAL)
Attest:

Edward M. Fletcher, Jr.                            WILLIAM E. SCHUYLER, JR.
Attesting Officer                                        Commissioner of Patents